United States Patent [19]

Way

[11] Patent Number: 5,092,088
[45] Date of Patent: Mar. 3, 1992

[54] BIRD DETERRING DEVICE

[76] Inventor: Michael F. W. Way, 61 Wigram Street, Harris Park, N.S.W., Australia

[21] Appl. No.: 543,335

[22] Filed: Jun. 25, 1990

[51] Int. Cl.⁵ .............................................. E04B 1/72
[52] U.S. Cl. ...................................................... 52/101
[58] Field of Search ...................... 52/25, 101; 256/11, 256/12

[56] References Cited

U.S. PATENT DOCUMENTS

| | | | |
|---|---|---|---|
| 1,233,230 | 7/1917 | Hassett | 256/12 |
| 3,416,266 | 12/1968 | Eron | 52/25 |
| 4,937,988 | 7/1990 | Grafton | 256/11 |

FOREIGN PATENT DOCUMENTS 666147  2/1952  United Kingdom .................... 52/25

Primary Examiner—James L. Ridgill, Jr.
Attorney, Agent, or Firm—Limbach & Limbach

[57] ABSTRACT

A device for deterring birds from roosting or nesting on building ledges and the like having one or more wires linking the opposing faces of two wire attachment means that are fixedly mounted on said ledge or the like. The wire(s) are connected to one wire attachment means by retracting means which adjusts the length and tension on the wire(s) when attached to the opposing wire attachment means. When more than one wire is used, the wires may be separately or collectively sprung by means of a spring loaded drum.

9 Claims, 3 Drawing Sheets

BIRD DETERRING DEVICE

BACKGROUND OF THE INVENTION

The present invention relates to a device for deterring birds from roosting or nesting on building ledges and the like.

Much damage may be caused by pest birds roosting or nesting on building ledges, such as a window sill, or water drainage canals. The type of damage may vary from the fouling of surfaces to major structural and functional deterioration.

SUMMARY OF THE INVENTION

The present invention provides a device for deterring birds from roosting or nesting on building ledges and the like. The device comprises two wire attachment means adapted to be fixedly mounted on the ledge or the like, one or more wires linking the opposing faces of the wire attachment means and positioned so that when the device is in its assembled position the wires obstruct the roosting or nesting activities of the bird, one or more wire retracting means located on one wire attachment means which in operation adjust(s) the length and tension on the wires, either separately or collectively as the case may be, when attached to the opposing wire attachment means.

A better understanding of the features and advantages of the present invention will be obtained by reference to the following detailed description of the invention and accompanying drawings which set forth an illustrative embodiment in which the principles of the invention are utilized.

DESCRIPTION OF PREFERRED EMBODIMENTS

Figure 1:
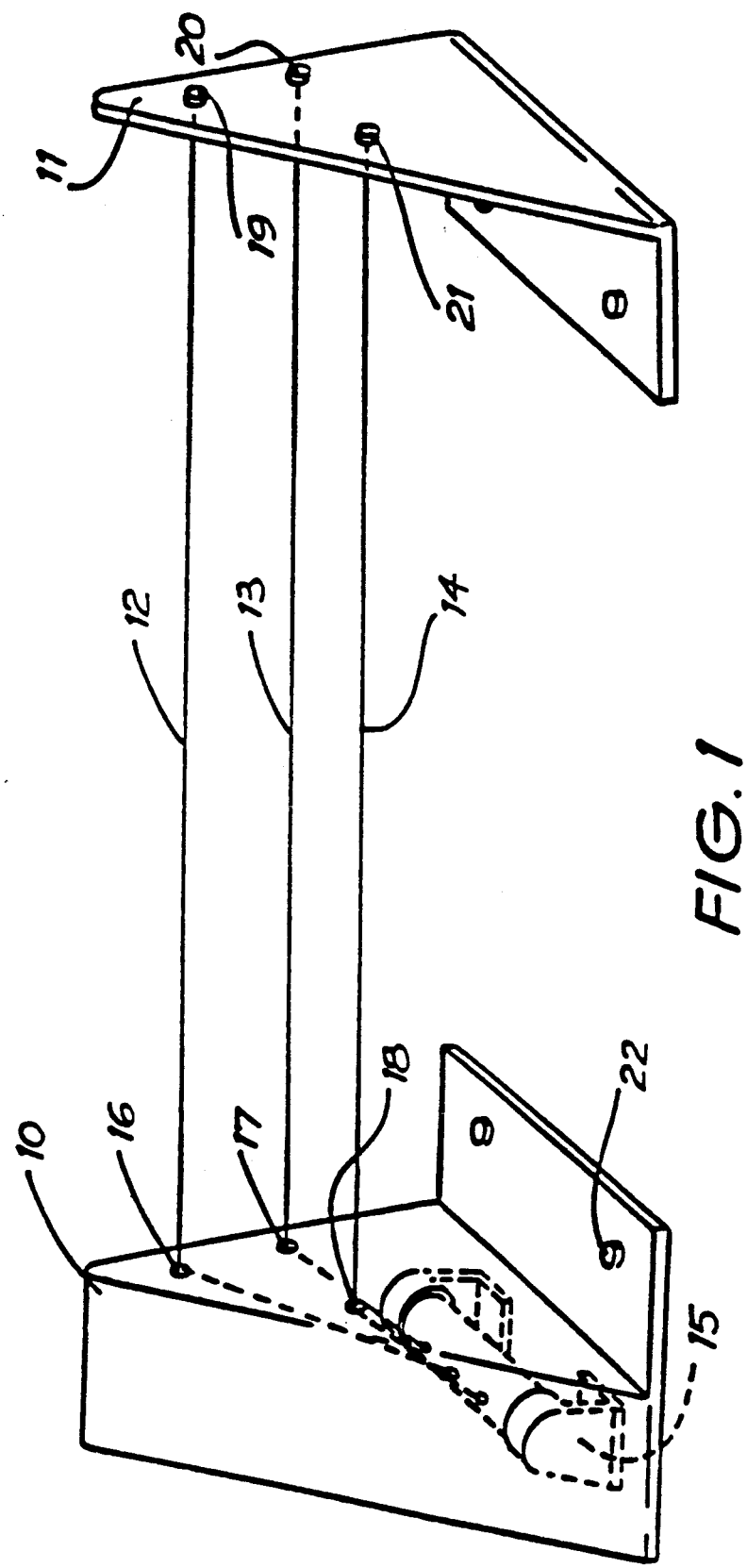
FIG. 1 is a perspective view illustrating a bird deterring device according to one embodiment of the invention where the wires are collectively sprung.

The device of FIG. 1 comprises transparent opposing brackets 10 and 11, linking wires 12, 13 and 14 which are fed from a retracting means 15 and pass through wire positioning holes 16, 17 and 18 for attachment at the opposing bracket 11 at fastening points 19, 20 and 21. The device is secured to a surface through securing means 22.

Figure 2:
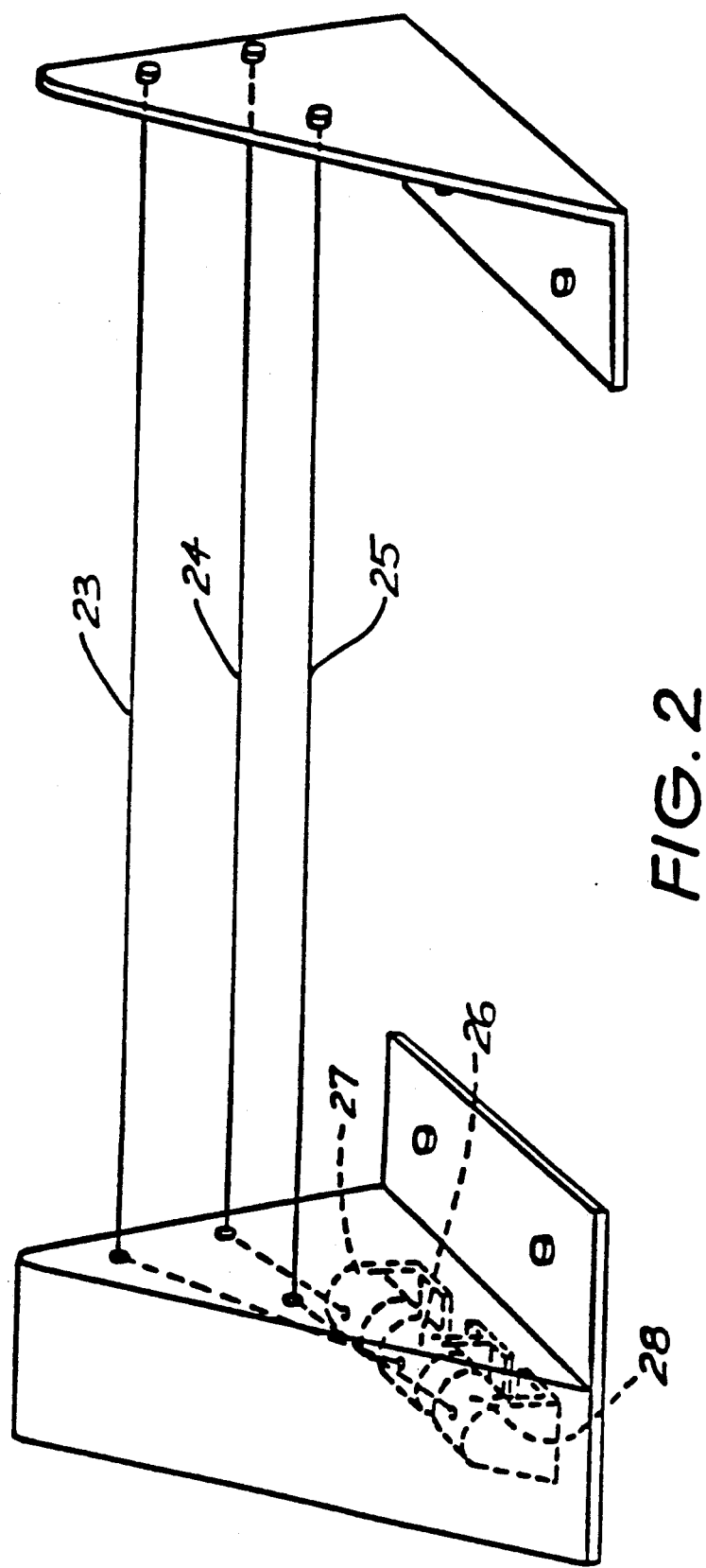
FIG. 2 is a perspective view illustrating a bird deterring device according to another embodiment of the invention where the wires are independently sprung.

The device of FIG. 2 varies from that of FIG. 1 only in that the linking wires 23, 24 and 25 are independently sprung from separate retracting means 26, 27 and 28 respectively.

Figure 3:
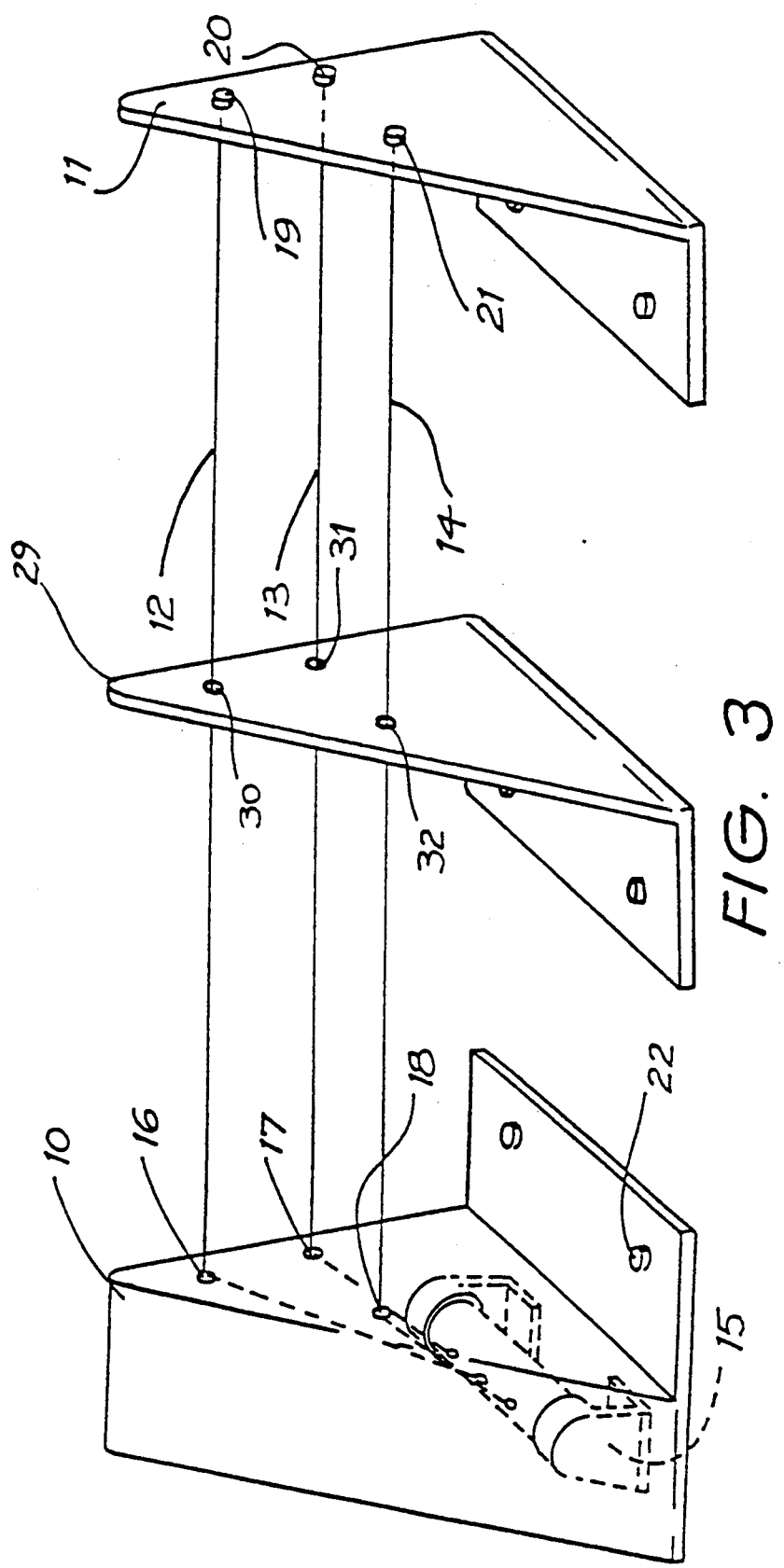
FIG. 3 is a perspective view illustrating the bird deterring device of FIG. 1 and including supporting means.

The device of FIG. 3 varies from that of FIG. 1 only in that it includes a supporting bracket 29 having holes 30, 31 and 32 that support the wires 12, 13 and 14, respectively.

When the device of either of FIGS. 1 or 2 is secured to a ledge, the position and tension of the linking wires should be such that they effectively obstruct the roosting or nesting activities of the target bird.

The degree to which each wire will retain its tension when the device is assembled is dependent primarily on the inherent properties and dimensions of the wire. It has been found that, where a long length of surface is to be protected, the wire preferably used in the device will retain effective tension when assembled if there is a distance of about 4 meters between opposing wire attachment means and the same wires are supported at the mid-point of their length by a supporting means. Accordingly, the supporting means should provide resting support to the wires, thereby reducing any sagging of the wires over their length.

In a preferred embodiment of the invention, the wire attachment and supporting means are brackets made of a non-corrosive material and the wires are positioned between the brackets at the mean breast height of the target bird.

Preferably, when one retracting means operates to adjust the length and tension on all the wires collectively, the retracting means incorporates a spring loaded drum that automatically winds the wires when the wires are detached from the opposing wire attachment means. More preferable still is the use of separate retracting means for each wire that are independently sprung to produce the desired wire length and tension. In this embodiment, each independently sprung wire is connected to a spring loaded drum that automatically winds the wire when it is detached from the opposing wire attachment means. One advantage of having independently sprung wires is to accommodate the different changes to length and tension that are experienced by each wire when the opposing wire attachment means is moved relative to the retracting means.

The retracting means includes a spool which is enclosed in a hard plastic casing and about which is wound a length of wire. The spool has a central bore that fits loosely over an axial lug protruding to the interior of the casing. A coil of sprung steel is looped over the lug and sits within the bore of the spool. The coil is attached at its outer most end to the bore of the spool and is attached at its inner most end to the lug. In this way, the spool is allowed to rotate, but only under tension exerted by the spring coil as the spring coil tightens around the lug. There is a second roller which receives a portion of the wire from the spool and orientates it in a direction that it may leave the casing through a hole therein. When in its fully retracted state, only a looped part at one end of the wire emerges from a hole in the casing. In extending the wire from the casing, the loop is pulled away from its resting position and the wire is extended from the casing against a force exerted by the spring in the opposite direction. The wire is therefore fastened under tension. Upon release, the wire is automatically rewound onto the spool, leaving only the looped part of the wire emerging from the casing.

Alternatively, the retracting means, when used to adjust the length and tension of wires separately or collectively, may incorporate a drum that is hand wound. In this embodiment of the invention, the maintenance of tension in the wires will primarily require the drum axle to be movable and fixed in a spring loaded mounting. In order to adjust the relative position of the wire attachment means, the wire attachment at the opposing wire attachment means may be removable or permanently fixed if the wire attachment means itself is readily detachable.

When brackets are used as the wire attachment and supporting means, the brackets may be fixed to a surface by adhesive, bolts, rivets, fixing screws or by other securing means appropriate for the purpose.

Various modifications may be made in details of design and construction without departing from the scope and ambit of the invention.

I claim:

1. A device for deterring birds from roosting or nesting on building ledges and the like, the device comprising:
   (a) first and second wire attachment means adapted to be fixedly mounted in spaced-apart relationship in an assembled position;
   (b) at least one wire detachably connectable between the first and second wire attachment means and positionable so that when the device is in its assembled position the at least one wire obstructs the roosting or nesting activities of birds; and
   (c) wire retracting means connected to the at least one wire for adjusting the length of and tension on the at least one wire when the at least one wire is connected to the second wire attachment means and for automatically retracting the at least one wire when the at least one wire is detached from the second attachment means.

2. A device as in claim 1 and further including supporting means for providing resting support to the at least one wire at its midpoint when the first and second wire attachment means are spaced apart by about four meters or greater when the device is in its assembled position.

3. A device as in claim 1 wherein the wire retracting means comprises a spring loaded drum.

4. A device as in claim 1, 2 or 3 wherein the at least one wire is positioned at the mean breast height of a target bird when the device is in its assembled position.

5. A device for deterring birds from roosting or nesting on building ledges and the like, the device comprising:
   (a) first and second wire attachment means adapted to be fixedly mounted in spaced-apart relationship in an assembled position;
   (b) at least one wire detachably connectable between the first and second wire attachment means and positionable so that when the device is in its assembled position the wires obstruct the roosting or nesting activities of birds; and
   (c) wire retracting means connected to the plurality of wires for adjusting the length of and tension on the wires when the wires are connected to the second attachment means and for automatically retracting the wires when the wires are detached from the second attachment means.

6. A device as in claim 5 wherein the wire retracting means comprises means for collectively adjusting the length of and tension on the plurality of wires.

7. A device as in claim 5 wherein the wire retracting means comprises means for individually adjusting the length of and tension on each of the plurality of wires.

8. A device as in claim 5 wherein the wire retracting means comprises a spring loaded drum.

9. A device as in claim 1 or 5 wherein the wire retracting means includes a hand wound drum.

* * * * *